United States Patent [19]

Matsumoto

[11] Patent Number: 5,767,646
[45] Date of Patent: Jun. 16, 1998

[54] METHOD OF AND APPARATUS FOR DETECTING ANOMALOUS RUNNING OF MOTOR

[75] Inventor: Kaname Matsumoto, Oshino-mura, Japan

[73] Assignee: Fanuc Ltd., Yamanashi, Japan

[21] Appl. No.: 750,615

[22] PCT Filed: Apr. 19, 1996

[86] PCT No.: PCT/JP96/01076

§ 371 Date: Dec. 13, 1996

§ 102(e) Date: Dec. 13, 1996

[87] PCT Pub. No.: WO96/33549

PCT Pub. Date: Oct. 24, 1996

[30] Foreign Application Priority Data

Apr. 19, 1995 [JP] Japan .................................. 7-116554

[51] Int. Cl.⁶ .................................................. H02P 5/00
[52] U.S. Cl. .................... 318/563; 318/560; 318/603; 318/613; 318/618
[58] Field of Search ...................... 318/560–696, 318/800–832; 364/474.1–474.32

[56] References Cited

U.S. PATENT DOCUMENTS

| | | | |
|---|---|---|---|
| 3,555,252 | 1/1971 | Garden | 235/151.1 |
| 4,401,930 | 8/1983 | Kato et al. | 318/603 |
| 4,484,287 | 11/1984 | Gamo et al. | 364/474 |
| 4,591,770 | 5/1986 | Isobe et al. | 318/565 |
| 4,743,822 | 5/1988 | Futami et al. | 318/610 |
| 4,965,504 | 10/1990 | Ueda et al. | 318/802 |

FOREIGN PATENT DOCUMENTS

| | | |
|---|---|---|
| 50-091711 | 7/1975 | Japan . |
| 55-127893 | 10/1980 | Japan . |
| 56-003587 | 1/1981 | Japan . |
| 59-172993 | 9/1984 | Japan . |
| 62-032402 | 2/1987 | Japan . |
| 62-081492 | 5/1987 | Japan . |
| 64-043084 | 2/1989 | Japan . |
| 3-145987 | 6/1991 | Japan . |
| 4-054885 | 2/1992 | Japan . |
| 4-165503 | 6/1992 | Japan . |
| 4-279906 | 10/1992 | Japan . |
| 5-265558 | 10/1993 | Japan . |
| 6-292377 | 10/1994 | Japan . |

*Primary Examiner*—Paul IP
*Attorney, Agent, or Firm*—Staas & Halsey

[57] ABSTRACT

A method of and an apparatus for quickly detecting an anomalous running of a motor. In a motor control system which executes a speed loop process by feeding back a speed of the motor and also a position loop process by feeding back a position of a mechanical system driven by the motor, a speed feedback value of the motor is compared with a reference value, and a direction of the speed feedback value with the direction of a position feedback value. It is discriminated that the motor is running anomalously, when an absolute value of the speed feedback value is larger than the reference value and the sign of the speed feedback value is reverse to the sign of the position feedback value.

6 Claims, 10 Drawing Sheets

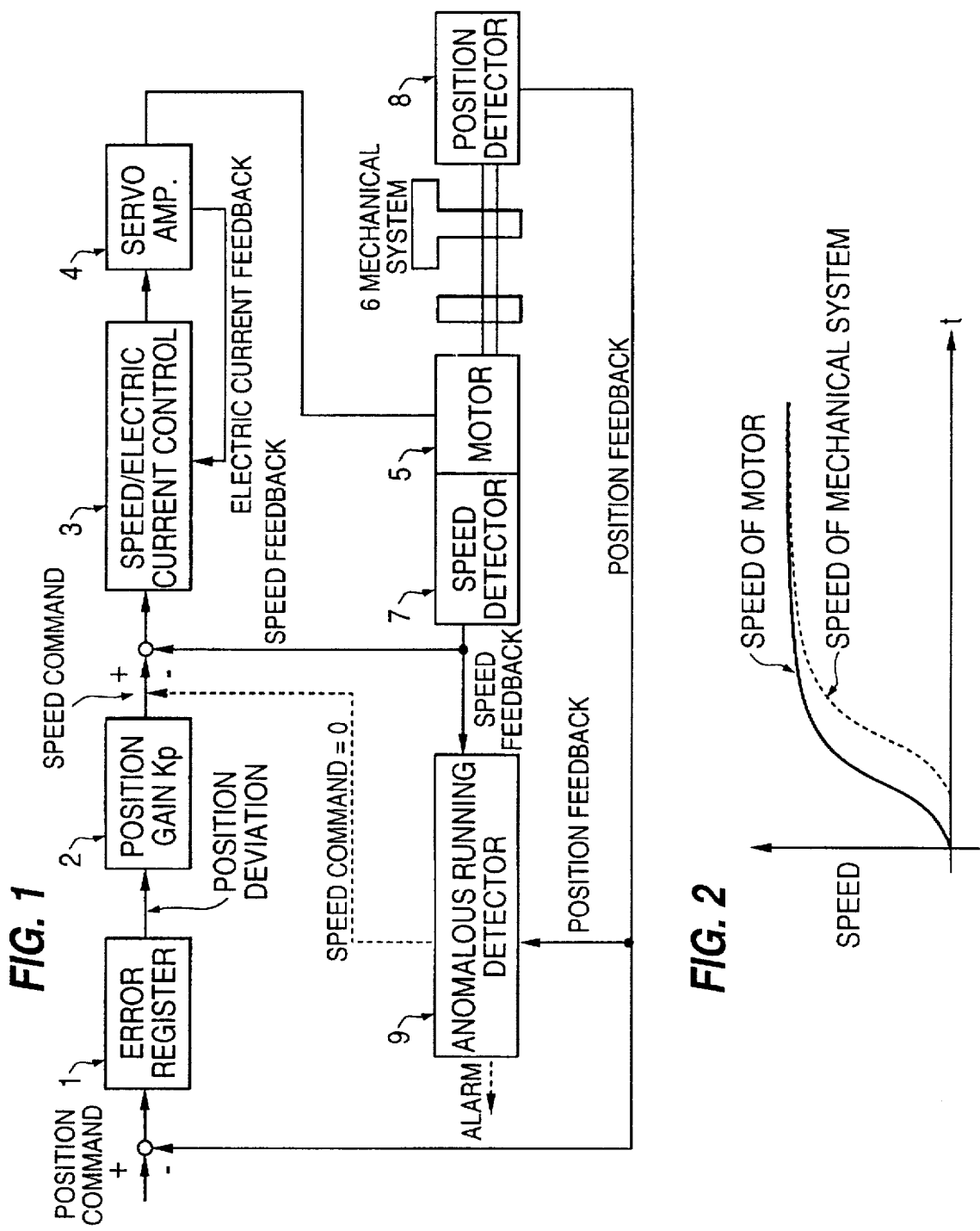

[POSITION FEEDBACK]

[POSITION DEVIATION]

[SPEED COMMAND]

[SPEED FEEDBACK]

[POSITION FEEDBACK]

[POSITION DEVIATION]

[SPEED COMMAND]

[SPEED FEEDBACK]

[SPEED DEVIATION]

[POSITION FEEDBACK]

[POSITION DEVIATION]

[SPEED COMMAND]

[SPEED FEEDBACK]
BASE SPEED V0

[POSITION DEVIATION]

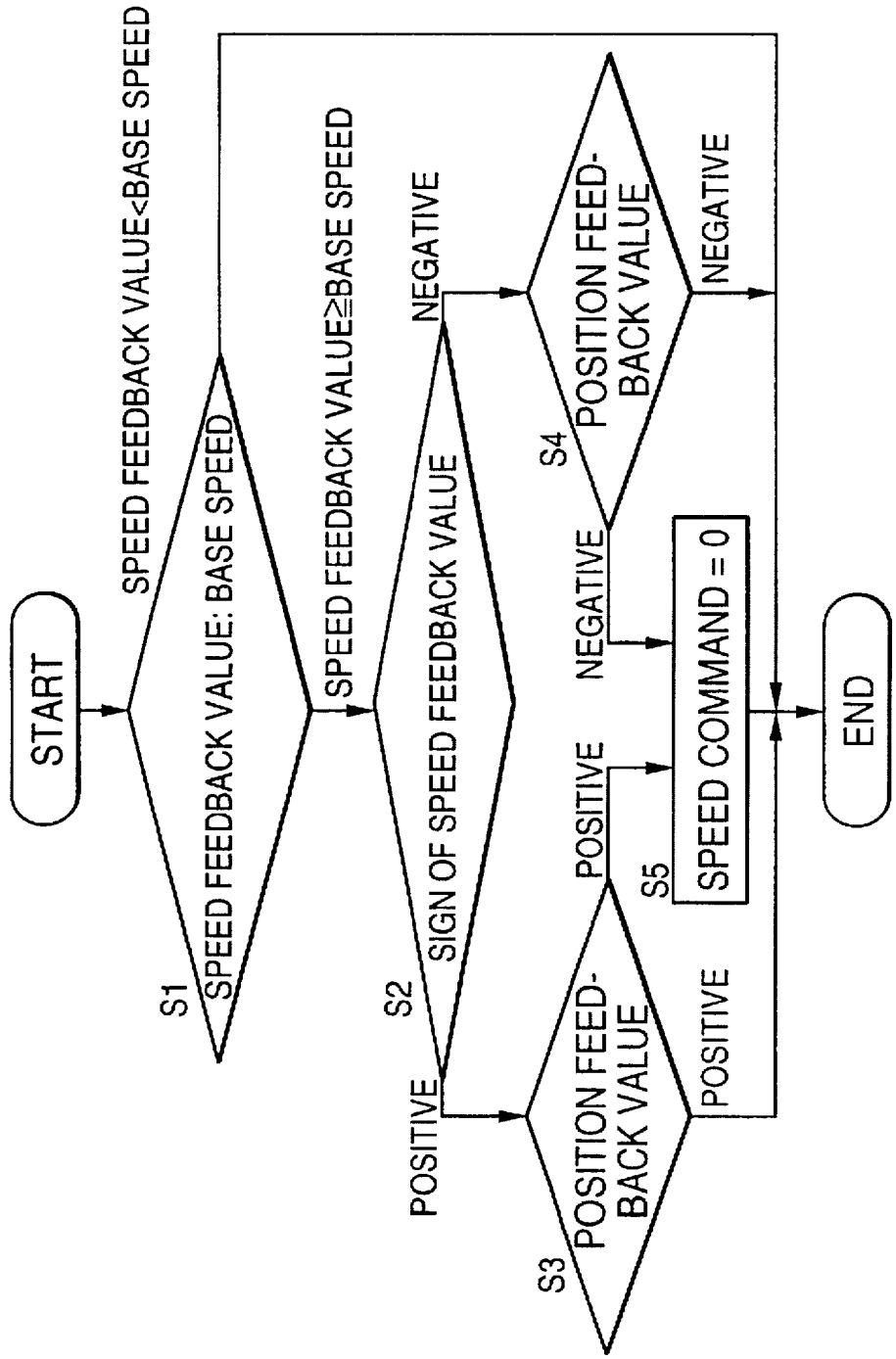

METHOD OF AND APPARATUS FOR DETECTING ANOMALOUS RUNNING OF MOTOR

This application is a 371 of PCT/JP96/01076 filed on Apr. 19, 1996.

TECHNICAL FIELD

The present invention relates to control of a servomotor, and more particularly to a method of and an apparatus for detecting an anomalous running of a motor controlled by a software servo control system.

BACKGROUND ART

FIG. 8 is a block diagram of a conventional servomotor control system. In FIG. 8, a control of the servomotor is generally performed in the following manner. The position of a mechanical system 6 detected by a position detector 8, such as an encoder, is fed back and the position feedback value is subtracted from a position command to obtain a position deviation by an error register 1. This position deviation is multiplied by a position gain Kp of an element 2 to obtain a speed command by a position loop process. A speed of a motor 5 detected by a speed detector 7 is fed back and the speed feedback value is subtracted from the speed command to obtain a speed deviation, so that a torque command (an electric current command) is obtained by a speed loop process such as a proportion-integration control. Further, an electric current feedback value is subtracted from the torque command to obtain a voltage command by a current loop process, and the electric current is fed to a motor 5 by a servo amplifier 4 based on the voltage command. In FIG. 8, an element 3 performs a speed loop process and a current loop process. In this control system, the position to be fed back is a position of a mechanical system 6 driven by the motor 5.

FIGS. 9a–9c and 10a–10c respectively show relation between the position deviation and the speed command in the control system as shown in FIG. 8.

FIGS. 9a–9c show a case in which the motor 5, the speed detector 7 and the position detector 8 operate in a normal condition. In FIG. 9a, the position of the mechanical system, which is detected by the position detector 8, is fed back to a position command to obtain a position deviation, as shown in FIG. 9b. The speed command (FIG. 9c) is determined based on this position deviation and the motor is driven on the basis of the speed command to thereby reduce the position deviation.

FIGS. 10a–10c show a case in which the motor 5, the speed detector 7 and the position detector 8 do not operate normally, to cause an anomalous running of the motor 5. In FIG. 10a, the negative or positive sign of the feedback value, which indicates the moving direction of the position of the mechanical system, is opposite to the sign indicating the direction of the position command. As shown in FIG. 10b, although the actual position of the mechanical system approximates to the position command so that the actual position deviation decreases, a position deviation obtained by the error register 1 increases. The speed command increases in accordance with the increased position deviation, as shown in FIG. 10c, so that the motor is driven in accordance with the speed command. Thereby the motor is accelerated to cause an anomalous running.

A cause for such anomalous running is exemplified by a misconnection of cables in attaching the speed detector and the position detector, by which the sign of detection signals output from the speed detector or the position detector is opposite to the direction of the position command.

So as to prevent the anomalous running of the motor, there is conventionally provided an anomalous running detector 10 which detects an anomalous running when the position deviation between the position command and the position feedback value exceeds a set value. Upon detection of an anomalous running, the anomalous running detector 10 issues an alarm or shuts off the energization of the motor. FIGS. 11a and 11b show the conventional anomalous running detecting method in which the position deviation is compared with a predetermined reference value a and the speed command is made zero when the position deviation exceeds the reference value α.

The control system generally utilizes a pulse control. In FIGS. 9 to 11, however, the pulse signals are depicted as continuous signals for the sake of explanation.

In the conventional anomalous running detecting method, there is a problem that the detection timing of an anomalous running of the motor is delayed due to the position deviation produced by a delay of the servo system.

A position loop of the control system for controlling a servomotor usually constitutes a first order delay system. Therefore, even when the servomotor operates normally, a position deviation determined by a feed speed and a position gain would practically exist. This position deviation is expressed by the following equation (1):

$$\text{position deviation [pulse]} = \text{feed speed [pulses/sec]} / \text{position gain [1/sec]} \qquad (1)$$

FIG. 12 is a diagram showing a position deviation produced in a first order delay system. In FIG. 12, when a trapezoidal speed command indicated in a solid line is inputted, a time delay would occur in a resulting speed due to the first order delay of the position loop of the control system, thus producing a position deviation (indicated by hatching in FIG. 12), which corresponds to the integrated value.

FIGS. 13a–13h are diagrams for explaining the effect of a position deviation in detecting an anomalous running of the motor. FIGS. 13a–13d show the case in which the motor runs normally, while FIGS. 13e–13h show the case in which the motor runs anomalously.

In the case where the motor is running normally, a position deviation $\epsilon_0$ according to the equation (1) is regularly produced as shown in FIG. 13b. Therefore, so as to discriminate whether or not the motor is running anomalously using the position deviation, it is necessary to set the reference value larger than the position deviation which is determined in accordance with the feed speed in operation. Consequently, in the conventional anomalous running detecting method, it is discriminated that the motor is running anomalously when the position deviation exceeds a value obtained by multiplying the position deviation quantity $\epsilon_0$ by a certain coefficient.

FIG. 13e shows the case where the direction of the position feedback is reversed with respect to the direction of the position command, to cause an anomalous running. In this case, the anomalous running detection is carried out using the reference value (chain line) of $1.5\epsilon_0$ which is determined by multiplying the position deviation $\epsilon_0$ by the coefficient of 1.5 as shown in FIG. 13f. When the anomalous running is detected the speed command is controlled to be zero (FIG. 13g). Since an anomalous running cannot be detected until the position deviation exceeds the reference value of $1.5\epsilon_0$, the detection timing of the anomalous running is delayed.

SUMMARY OF THE INVENTION

It is therefore an object of the present invention to provide a method of and an apparatus for quickly detecting an anomalous running of a motor.

A method of detecting an anomalous running of a motor of the present invention is applied to a motor control system in which a position loop process is executed by feeding back a position of a mechanical system driven by the motor and a speed loop process is executed by feeding back the speed of the motor. This method of detecting an anomalous running of a motor comprises the steps of: comparing the speed feedback value of the motor with a reference value and discriminating whether or not the speed feedback value is larger than the reference value; comparing a sign of said speed feedback value with a sign of the position feedback value and discriminating whether or not the sign of the speed feedback value is identical with the sign of the position feedback value; and detecting the anomalous running of the motor based on the results of the two discriminations.

It is discriminated that the motor is running anomalously, when an absolute value of the feedback value is larger than the reference value and the sign of the speed feedback value is reverse to the sign of the position feedback value.

The reference value to be compared with the speed feedback value may be set to a value which the motor speed reaches in compliance with a speed command produced in accordance with a position deviation which is determined based on a feed speed of the motor and a position gain in a position loop. The speed command value in the motor control system may be set to zero when the anomalous running of the motor is detected.

Further, the present invention provides an apparatus for detecting an anomalous running for carrying out the above method of detecting an anomalous running. This apparatus comprises: a first discriminator for comparing a speed feedback value of the motor with a reference value and discriminating whether or not the speed feedback value is larger than the reference value; a second discriminator for comparing a sign of the speed feedback value with a sign of the position feedback value and discriminating whether or not the sign of the speed feedback value is identical with the sign of the position feedback value; and an anomalous running detector for outputting an anomalous running detection signal when the feedback value is larger than the reference value and the sign of the speed feedback value is opposite to the sign of the position feedback value. A speed command value in the motor control system may be set to zero to stop the motor in response to the anomalous running detection signal output from the anomalous running detector.

BRIEF DESCRIPTION OF DRAWINGS

FIG. 1 is a block diagram of a servo motor control system with an anomalous running detector for carrying out an anomalous running detecting method of the present invention;

FIG. 2 is a schematic diagram showing the relationship between a speed of a mechanical system and a speed of a motor;

FIG. 6 is a flowchart of processing of an anomalous running detection according to the present invention;

DETAILED DESCRIPTION OF THE PREFERRED EMBODIMENTS

Figure 3A:
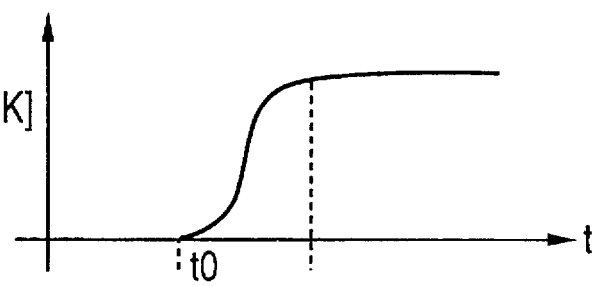
FIGS. 3a–3d are diagrams showing response characteristics of position and speed in the motor control system.

Hereinafter described is the control in a servo motor control system as shown in FIG. 1. A position of mechanical system 6 detected by a position detector 8 such as an encoder is fed back and the position feedback value is subtracted from a position command to obtain a position deviation by an error register 1. This position deviation is multiplied by a position gain Kp of an element 2 to obtain a speed command by a position loop control. A speed of a motor 5 detected by a speed detector 7 is fed back and the speed feedback value is subtracted from the speed command to obtain a speed deviation so that a torque command (an electric current command) is obtained by a speed loop processing such as a proportional/integral control. Further, an electric current feedback value is subtracted from the torque command and a voltage command is determined by a current loop process to control the motor 5 based on the voltage command through a servo amplifier 4.

The speed feedback value from the speed detector 7 and the position feedback value from the position detector 8 are input to an anomalous running detector 9 for detecting the anomalous running of the motor 5 based on these input values. The output from the detector indicating the anomalous running is used as a control signal for setting the speed command for the motor control system to zero, or an alarm signal.

The operation of the embodiment shown in FIG. 1 will be described below.

A delay time ordinarily exists between the speed of the mechanical system 6 driven by the motor 5 and the speed of the motor. FIG. 2 is a schematic diagram showing a relationship between the speed of the mechanical system 6 and the speed of the motor. The speed of the motor rises and then the speed of the mechanical system 6 rises after the lapse of delay time of the mechanical system 6. The delay time is determined in dependence on the characteristic of the mechanical system 6 connected to the motor 5. As the position detector 8 is attached to the mechanical system 6 rather than the motor 5, the detected and fed back position is a position of the mechanical system 6 rather than a position of the motor 5. Therefore, an error is caused between the position feedback value obtained from the position detector 8 and the position of the motor 5 due to the delay.

FIGS. 3a–3d are diagrams showing response characteristics of the position and speed in the motor control system shown in FIG. 1. A motion command is distributed from a non-illustrated numerical control unit, and a position command in accordance with the motion command is input to the control system of FIG. 1. A position deviation is obtained from the difference between the position command the position feedback value, and a speed command is produced in accordance with the position deviation.

Figure 3B:
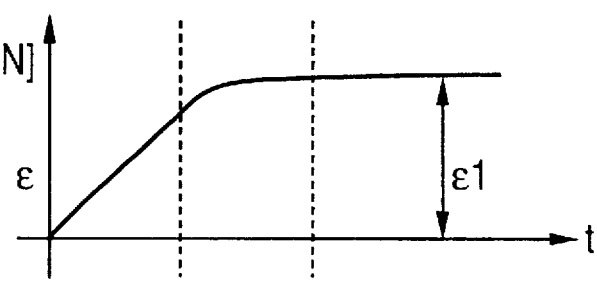
Figure 3C:
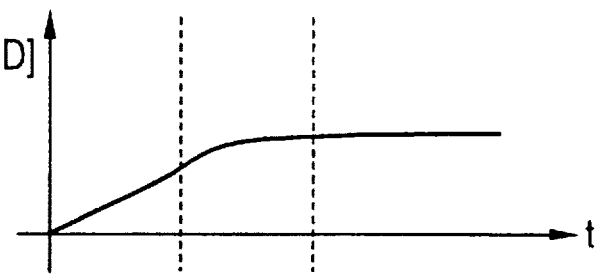
Figure 3D:
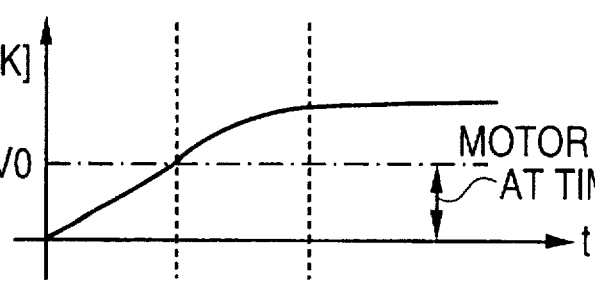

In FIG. 3a, assuming that $t_0$ represents the delay time of the mechanical system 6 driven by the motor 5, the input of the position feedback starts from time $t_0$. Therefore, as shown in FIG. 3b, a position deviation until the time $t_0$ is identical with the value of the position command input from the time 0 to the time $t_0$ if the motor 5 is driven normally. In this case, the speed command until the time $t_0$ is determined by the position deviation value, as shown in FIG. 3c. Thus, the speed feedback value of the motor 5 gradually approaches the speed command.

Feedback of the position feedback value starts at the time $t_0$ and thereby the position deviation of FIG. 3b gradually approaches a predetermined position deviation value $\epsilon_1$. As a result, the speed command of FIG. 3c gradually approaches a predetermined speed command value and the speed feedback value of FIG. 3d gradually approaches a predetermined speed.

A speed $V_0$ of the motor detected after lapse of the delay time $t_0$ of the mechanical system is the first available value for the detection performed by the anomalous running detector 9. Therefore, this speed $V_0$ is set to a base speed as a reference speed for detecting the anomalous running. This base speed is indicated in a chain line in FIG. 3d.

When an absolute value of the speed feedback from the speed detector 9 is not less than the base speed $V_0$, there is a possibility of anomalously running of the motor. Practically, an absolute value of the speed feedback exceeds the base speed $V_0$ even in the ordinary motor driving and not in the anomalously running. Therefore, according to the present invention, it is determined whether or not a sign of the speed feedback value is opposite to a sign of the position feedback value in addition to the determination of the speed feedback value, and based on the results of these determinations the anomalous running is discriminated.

If the sign of the speed feedback value is identical with the sign of the position feedback value, it means that there is no inconsistency in the control direction of the motor, and the motor control is performed such that the position deviation and the speed deviation converge. On the contrary, if the sign of the speed feedback value is opposite to the sign of the position feedback value, it means there is inconsistency in the control direction of the motor, and the motor control is performed such that the position deviation and the speed deviation diverge.

In detection of the anomalous running according to the present invention, a condition that the speed of the motor increases over the base speed and the control is performed so that the position deviation and the speed deviation are diverged is adopted as a reference for discriminating the anomalous running.

FIGS. 4a–4e and 5a–5e are diagrams for explaining the state of the position and speed in detecting the anomalous running according to the present invention. In FIGS. 4a–4e, the sign of the speed feedback value is negative and the sign of the position feedback value is positive. In FIGS. 5a–5e, the speed feedback value is positive and the position feedback value is negative.

Figure 4A:
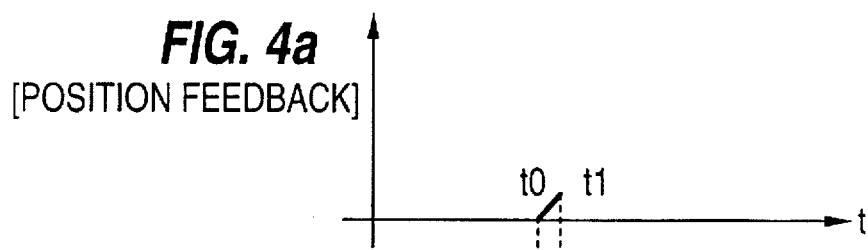
FIGS. 4a–4e are diagrams showing an example of detection timing of an anomalous running according to the method of the present invention in contrast with the conventional method.
Figure 4B:
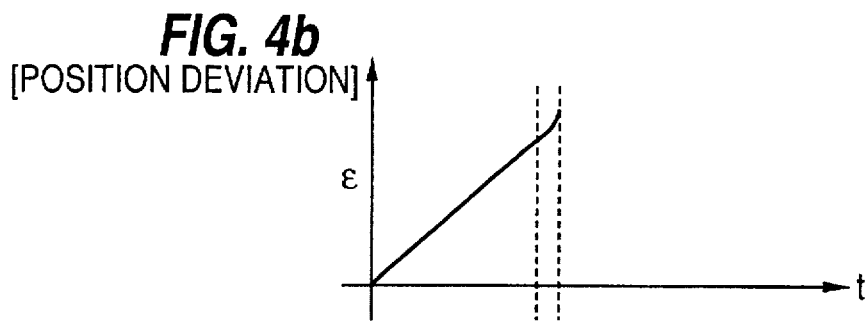
Figure 4C:
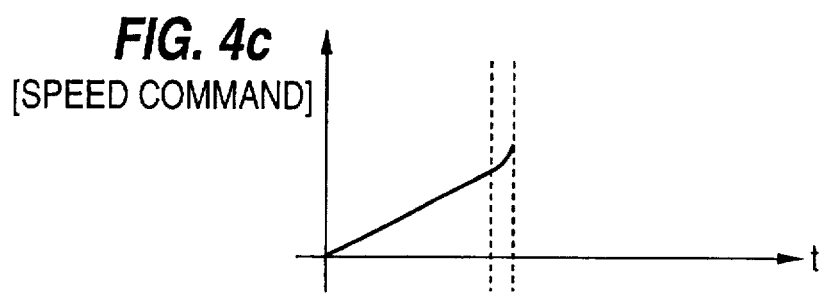
Figure 4D:
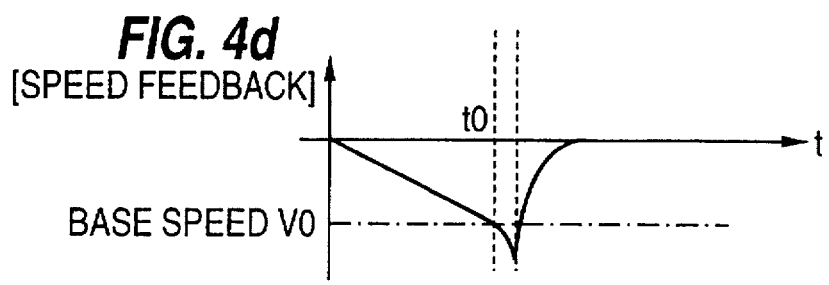
Figure 4E:
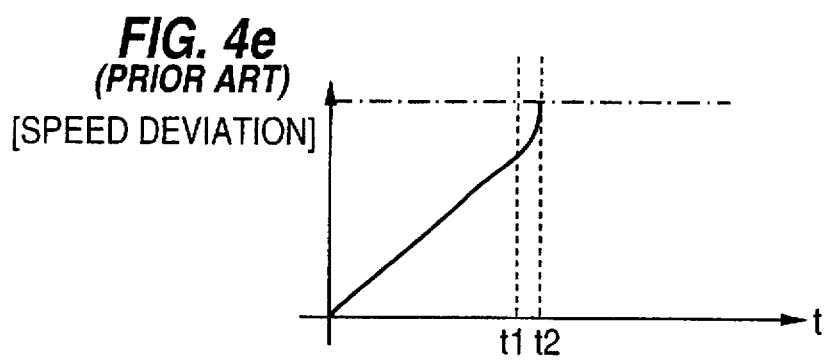

FIGS. 4a, 4b, 4c and 4d respectively show variation of the position feedback, the position deviation, the speed command and the speed feedback and FIG. 4e show variation of the position deviation in the conventional method.

In FIG. 4d, the speed feedback value increases in negative towards the base speed $V_0$ of the negative value and reaches the base speed at the time $t_0$. At that time, the anomalous running detector determines that an absolute value of the speed feedback value is not less than the base speed $V_0$. The anomalous running detector subsequently determines that the speed feedback value is negative and the position feedback value is positive in sign, and hence they are reverse to each other in direction at time $t_1$, to detect an anomalous running.

In contrast, FIG. 4e shows the detection of an anomalous running according to the conventional method in which a coefficient of 1.5 is multiplied by the position deviation quantity $\epsilon_0$ to obtain a reference for discrimination of the anomalous running. In this case, the anomalous running is detected at time $t_2$ later than the time $t_1$.

Figure 5A:
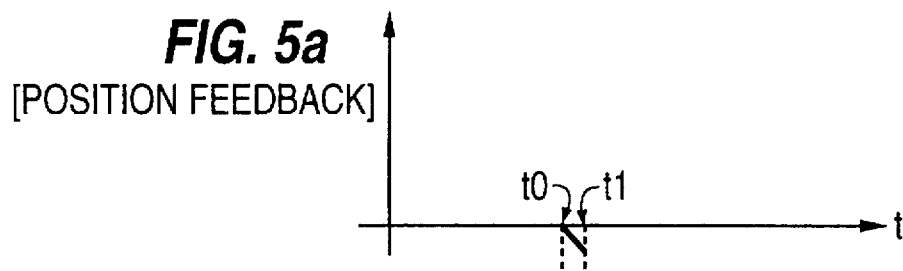
FIGS. 5a–5e are diagrams showing an alternative example of detection timing of an anomalous running according to the method of the present invention in contrast with the conventional method.
Figure 5B:
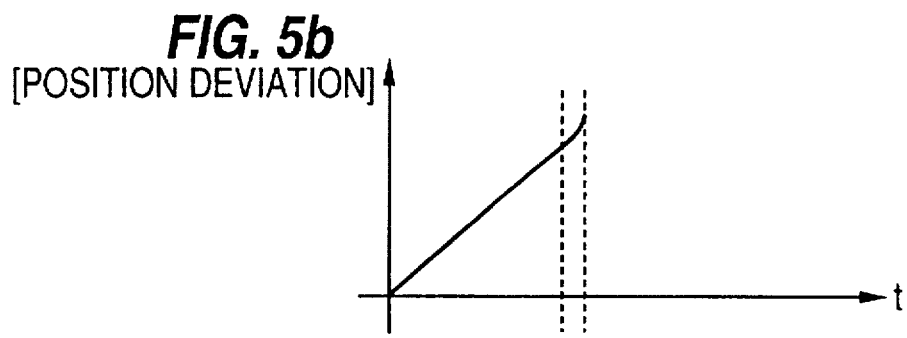
Figure 5C:
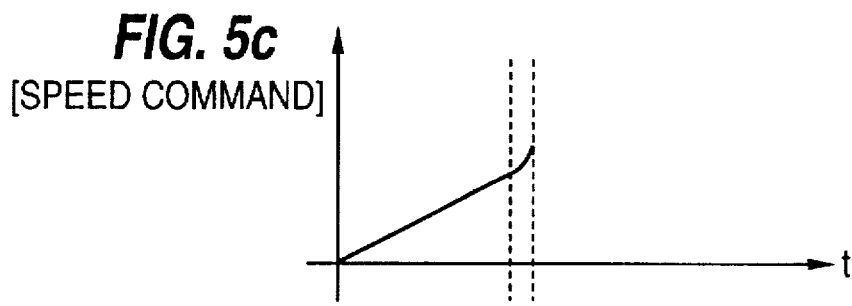
Figure 5D:
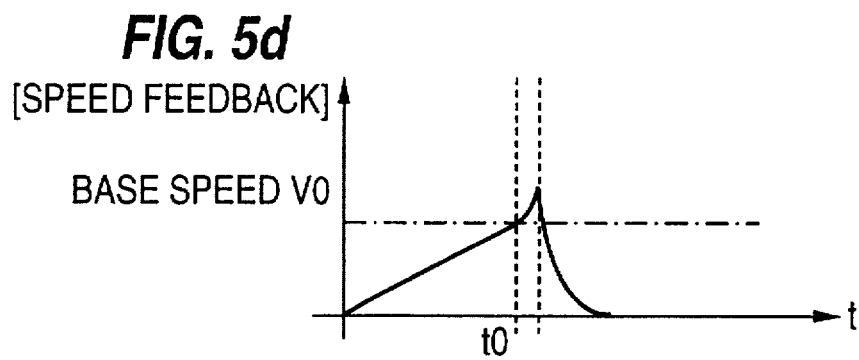
Figure 5E:
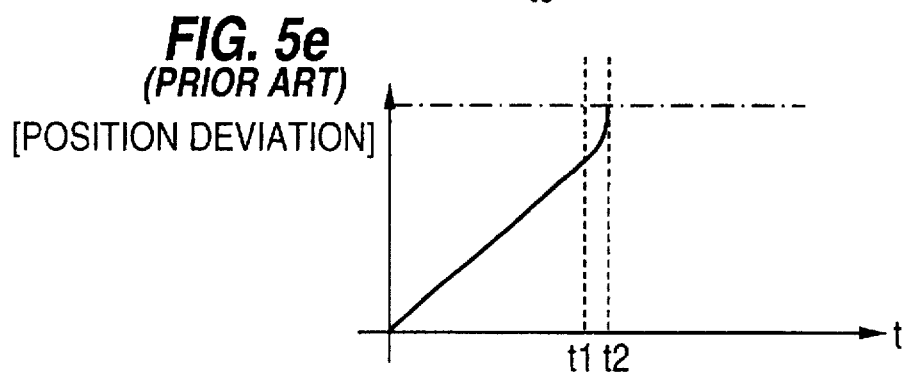

FIGS. 5a, 5b, 5c and 5d respectively show variation of the position feedback, the position deviation, the speed command and the speed feedback and FIG. 5e shows variation of the position deviation in the convention method.

In FIG. 5d, the absolute value of the speed feedback increases toward the base speed $V_0$ and reaches the base speed at the time $t_0$. At that time, the anomalous running detector determines that the absolute value of the speed feedback value is not less than the base speed $V_0$. The anomalous running detector subsequently determines that the speed feedback value is positive and the position feedback value is negative in sign, and hence they are opposite to each other in direction at the time $t_1$, to detect an anomalous running.

In contrast, FIG. 5e shows the detection of an anomalous running according to the conventional method in which a coefficient of 1.5 is multiplied by the position deviation quantity $\epsilon_0$ to obtain a reference for discrimination of the anomalous running. In this case also, the anomalous running is detected at time $t_2$ later than the time $t_1$.

According to the anomalous running detection method of the present invention, since a base speed is adopted, which is smaller than the speed level used in the conventional anomalous running detection, an anomalous running can be detected earlier than the conventional method.

The operation of the anomalous running detector will be described referring to the flowchart of FIG. 6.

Step S1: The speed feedback value from the speed detector 7 and the position feedback value are input to the anomalous running detector. First, the absolute value of the speed feedback Value is compared with the base speed. If the absolute value of the speed feedback value is below the base speed, it is determined that the motor is not running anomalously, and thus, to terminate the processing. Contrary, if the speed feedback value is not less than the base speed, it is discriminated that there is a possibility of anomalous running of the motor, to proceed to the next Step S2.

Step S2: The sign of the speed feedback value is determined. If the sign of the speed feedback value is positive, the processing proceeds to Step S3. Contrary, if the sign of the speed feedback value is negative, the processing proceeds to Step S4.

Step S3: The sign of the position feedback value is determined. In this determination, if the sign of the position feedback value is negative, the sign of the speed feedback value and the sign of the position feedback value are opposite to each other. In this case, it is discriminated that the motor is running anomalously and the processing proceeds to Step S5 for restraining the anomalous running.

Contrary, if the sign of the position feedback value is positive, the sign of the speed feedback value and the sign of the position feedback value are the same. In this case, it is discriminated that the motor is not anomalously running, to terminate the processing.

Step S4: The sign of the position feedback value is determined. In this determination, if the sign of the position feedback value is negative, the sign of the speed feedback value and the sign of the position feedback value are opposite to each other. In this case, it is discriminated that the motor is running anomalously and the processing proceeds to Step S5 for restraining the anomalous running.

If the sign of the position feedback value is positive, the sign of the speed feedback value and the sign of the position feedback value are the same. In this case, it is discriminated that the motor is not anomalously running, to terminate the processing.

Step S5: If it is discriminated that the motor is running anomalously, the processing such as stopping the motor by setting the speed command to zero in the control system or displaying an alarm is performed.

The anomalous running of the motor can be detected by executing the foregoing processing in every predetermined period. Thus, the motor is prevented from the anomalous running due to an inverse-direction feedback signal which is caused by connecting the speed detector and/or the position detector, especially the position detector disposed separately from the control unit, in a wrong direction.

Figure 7A:
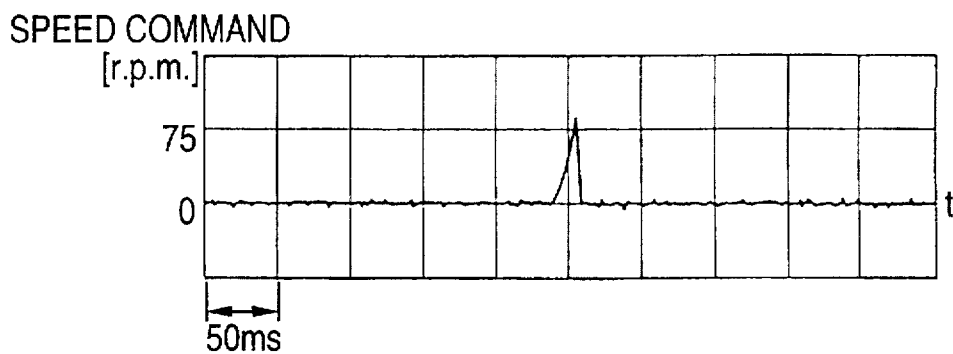
FIGS. 7a and 7b are graphs showing results of simulation according to the anomalous running detecting method of the present invention.
Figure 7B:
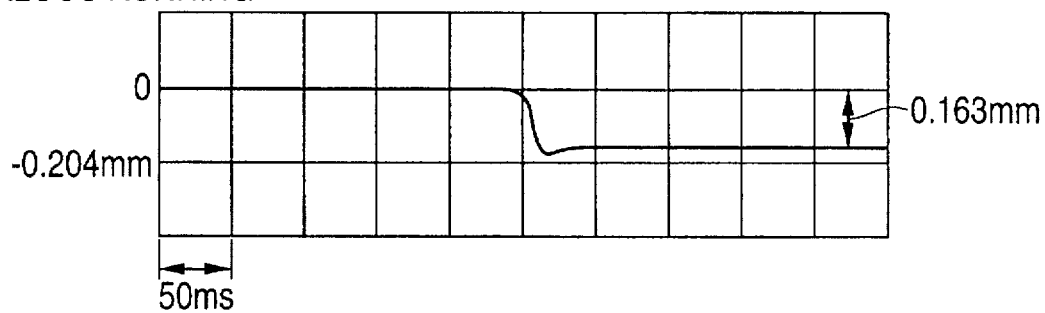
Figure 9A:
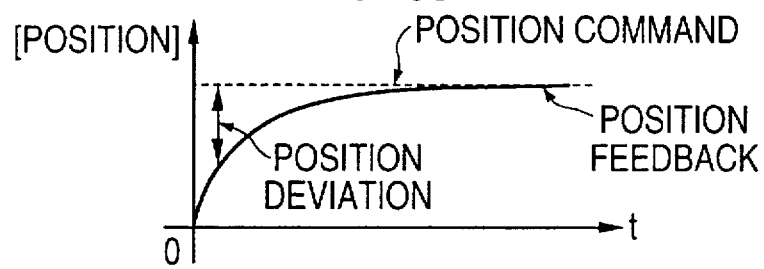
FIGS. 9a–9c are diagrams showing the relationship between a position feedback value, a position deviation and a speed command.
Figure 9B:
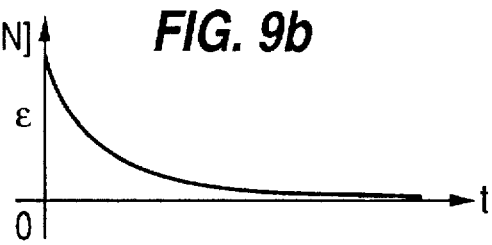
Figure 9C:
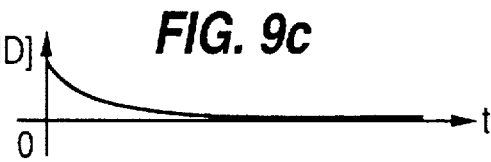
Figure 8:
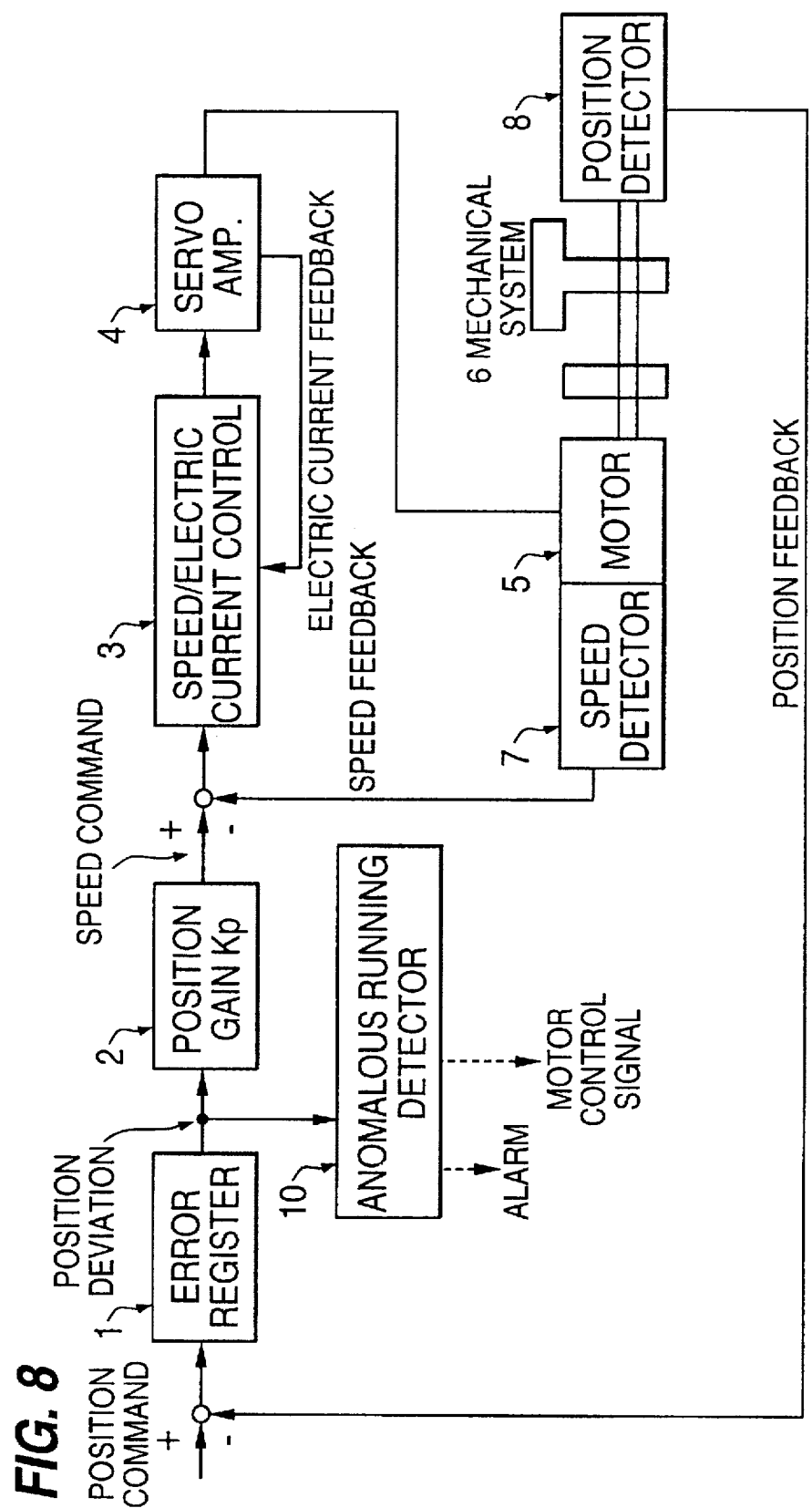
FIG. 8 is a block diagram of a servo motor control system with a conventional anomalous running detector.
Figure 10A:
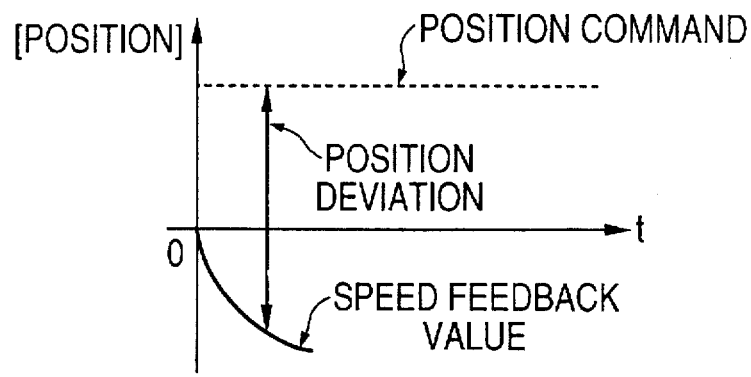
FIGS. 10a–10c are diagrams showing the relationship between a position feedback value, a position deviation and a speed command value when the motor runs anomalously.
Figure 10B:
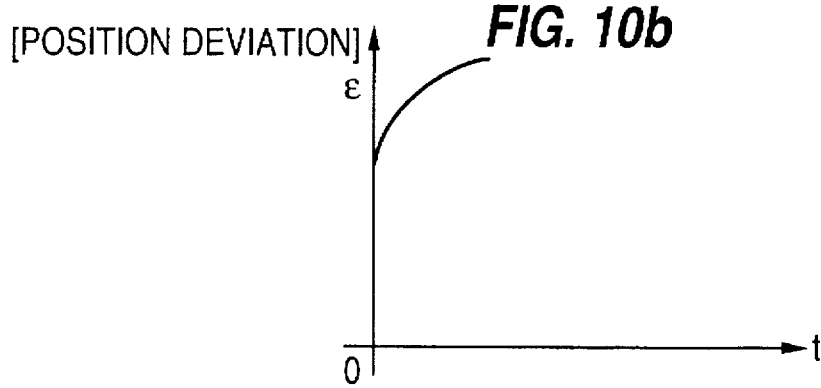
Figure 10C:
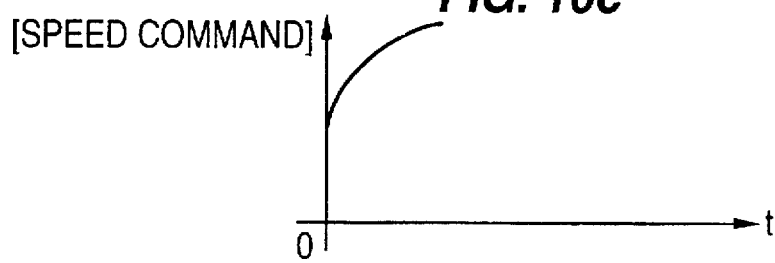
Figure 11A:
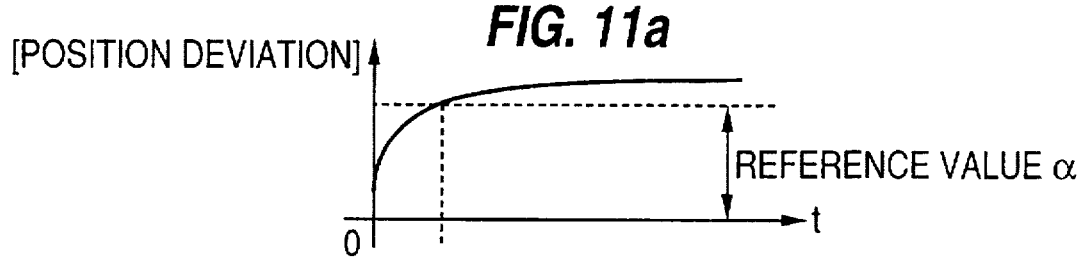
FIGS. 11a and 11b are diagrams schematically showing the conventional anomalous running detecting method.
Figure 11B:
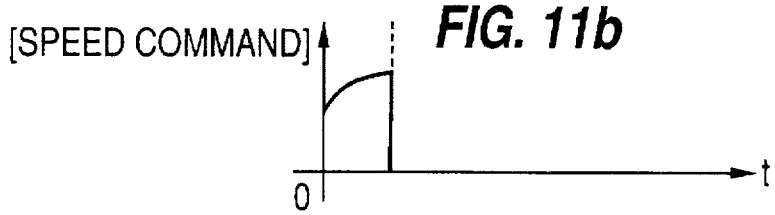
Figure 12:
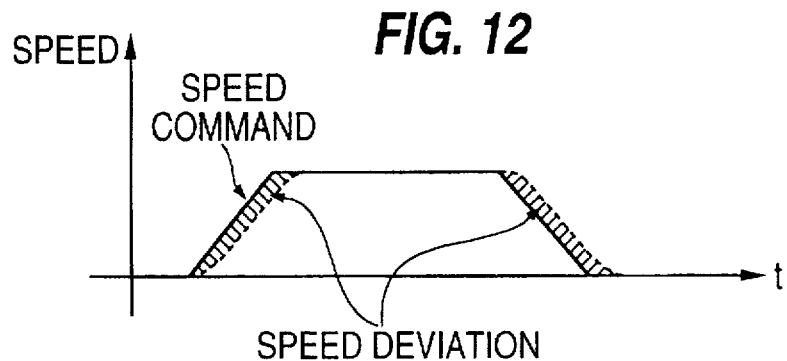
FIG. 12 is a diagram showing a position deviation in a first order delay system.
Figure 13A:
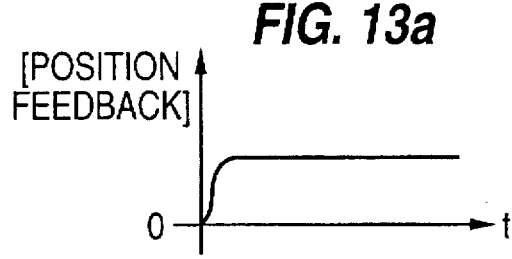
FIGS. 13a–13h are graphs showing effects of a position deviation upon detection of a runaway of a motor.
Figure 13E:
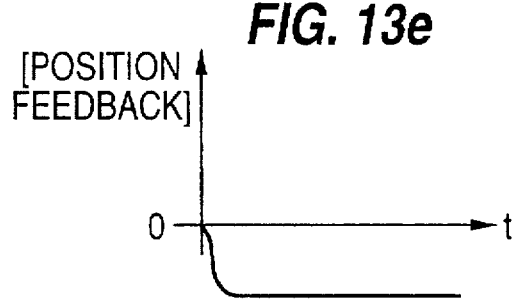
Figure 13B:
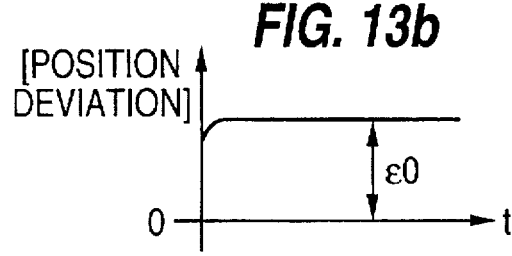
Figure 13F:
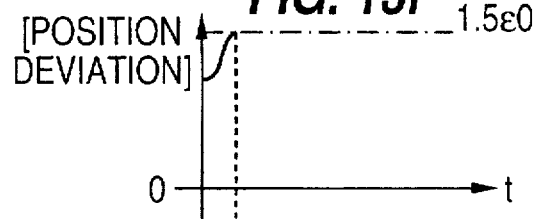
Figure 13C:
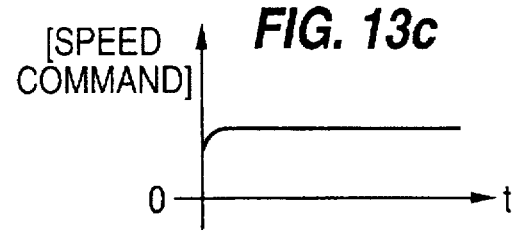
Figure 13G:
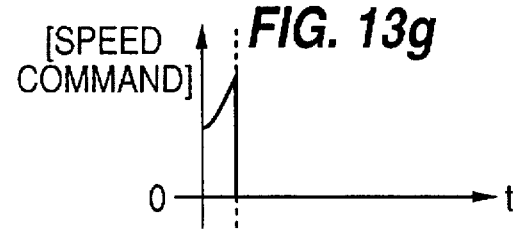
Figure 13D:
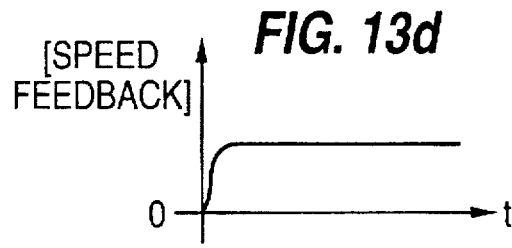
Figure 13H:
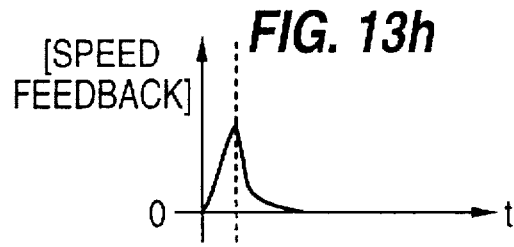

The results of simulation of the anomalous running detecting method of the present invention are shown in FIGS. 7a and 7b. In this simulation, a motion command of 700 mm/min and a position gain of 30/sec are used. Therefore, the position deviation value is 700/(30×60)= 0.388 mm according to the above equation (1). The base speed of 30 rpm is set.

FIG. 7a shows the speed command and FIG. 7b shows the length of the anomalous running. In this simulation, the motor is stopped after running anomalously by 0.163 mm.

Figure 14A:
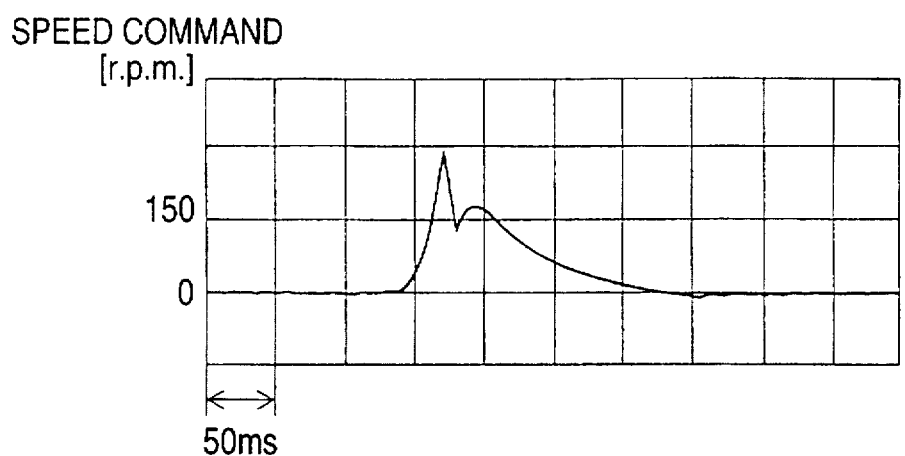
FIGS. 14a and 14b are graphs showing results of simulation according to the conventional anomalous running detecting method.
Figure 14B:
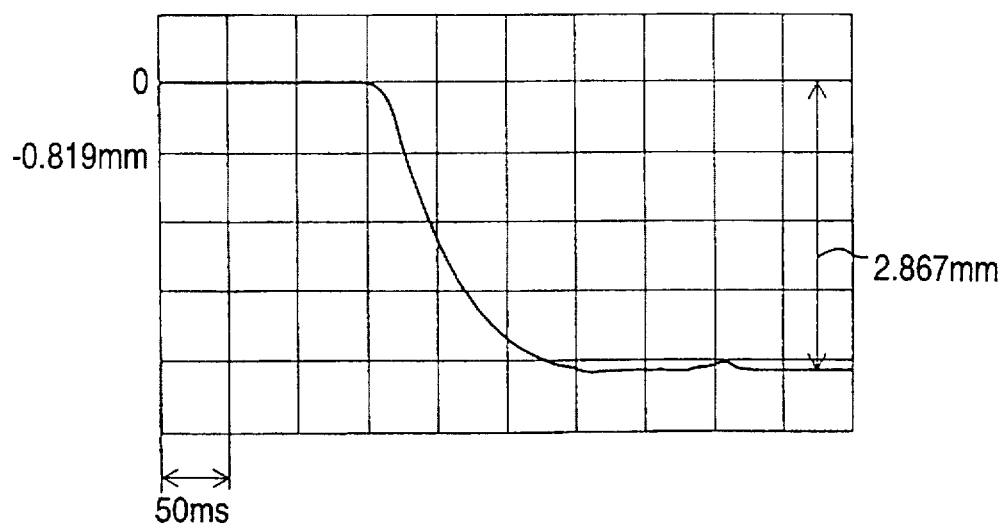

On the other hand, FIGS. 14a and 14b show the result of simulation according to the conventional anomalous running detecting method under the same condition as that of the simulation shown in FIGS. 7a and 7b. FIG. 14a shows the speed command and FIG. 14b shows the length of the anomalous running. In this simulation, the motor is stopped after running anomalously by 2.867 mm.

As described above, according to the present invention, there are provided a method of and an apparatus for quickly detecting an anomalous running of a motor.

I claim:

1. A method of detecting an anomalous running of a motor in a motor control system in which a position loop process is executed by feeding back a position of a mechanical system driven by the motor and a speed loop process is executed by feeding back a speed of the motor, said method comprising the steps of:

(a) comparing a speed feedback value of the motor with a reference value and discriminating whether or not said speed feedback value is larger than the reference value;

(b) comparing a sign of said speed feedback value with a sign of said position feedback value and discriminating whether or not the sign of said speed feedback value is identical with the sign of the position feedback value; and (c) detecting the anomalous running of the motor based on the result of discrimination in said step (a) and the result of discrimination in said step (b).

2. A method of detecting an anomalous running of a motor according to claim 1, wherein said step (c) includes the step of discriminating that the motor is anomalously running when an absolute value of said speed feedback value is larger than said reference value in said step (a) and the sign of said speed feedback value is reverse to the sign of said position feedback value in said step (b).

3. A method of detecting an anomalous running of a motor according to claim 1, wherein said reference value is a value which the motor speed reaches in compliance with a speed command produced in accordance with a position deviation which is determined based on a feed speed of the motor and a position gain in the position loop.

4. A method of detecting an anomalous running of a motor according to claim 1 further comprising the step of setting a speed command value of the motor control system to zero when the anomalous running of the motor is detected in said step (c).

5. An apparatus for detecting an anomalous running of a motor in a motor control system in which a position loop process is executed by feeding back a position of a mechanical system driven by the motor and a speed loop process is executed by feeding back a speed of the motor, said apparatus comprising:

a first discriminator for comparing a speed feedback value of the motor with a reference value and discriminating whether or not said speed feedback value is larger than said reference value;

a second discriminator for comparing a sign of said speed feedback value with a sign of said position feedback value and discriminating whether or not the sign of said speed feedback value is identical with the sign of said position feedback value; and an anomalous running detector for outputting an anomalous running detection signal when said feedback value is larger than said reference value and the sign of said speed feedback value is opposite to the sign of said position feedback value.

6. An apparatus for detecting an anomalous running of a motor according to claim 5, further comprising means for setting a speed command value of the motor control system to zero when said anomalous running detection signal is outputted from said anomalous running detector.

* * * * *